(12) United States Patent
Susnjara et al.

(10) Patent No.: US 12,103,224 B2
(45) Date of Patent: Oct. 1, 2024

(54) NEAR NET SHAPE ADDITIVE MANUFACTURING APPARATUS

(71) Applicant: Thermwood Corporation, Dale, IN (US)

(72) Inventors: Kenneth J. Susnjara, Birdseye, IN (US); Brian S. Smiddy, Newburgh, IN (US); John Fuquay, Boonville, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/618,324

(22) Filed: Mar. 27, 2024

(65) Prior Publication Data

US 2024/0239037 A1    Jul. 18, 2024

Related U.S. Application Data

(63) Continuation of application No. 18/188,034, filed on Mar. 22, 2023, now Pat. No. 11,969,936, which is a continuation of application No. 17/653,531, filed on Mar. 4, 2022, now Pat. No. 11,628,614, which is a continuation of application No. 17/402,820, filed on (Continued)

(51) Int. Cl.
| | |
|---|---|
| *B29C 64/118* | (2017.01) |
| *B29C 64/188* | (2017.01) |
| *B29C 64/209* | (2017.01) |
| *B29C 64/218* | (2017.01) |
| *B29C 64/236* | (2017.01) |
| *B29C 64/245* | (2017.01) |
| *B29C 64/25* | (2017.01) |
| *B29C 64/30* | (2017.01) |
| *B33Y 10/00* | (2015.01) |

(Continued)

(52) U.S. Cl.
CPC .......... *B29C 64/118* (2017.08); *B29C 64/188* (2017.08); *B29C 64/209* (2017.08); *B29C 64/218* (2017.08); *B29C 64/236* (2017.08); *B29C 64/245* (2017.08); *B29C 64/25* (2017.08); *B29C 64/30* (2017.08); *B33Y 10/00* (2014.12); *B33Y 30/00* (2014.12); *B33Y 40/20* (2020.01); *B29C 2793/009* (2013.01)

(58) Field of Classification Search
None
See application file for complete search history.

(56) References Cited

U.S. PATENT DOCUMENTS

| | | |
|---|---|---|
| 5,524,328 A | 6/1996 | Hardesty |
| 7,628,882 B2 | 12/2009 | Tingley |

(Continued)

OTHER PUBLICATIONS

"Original Prusa i3 Plus 1.75 mm kit assembly" Jan.-Apr. 2016, Apr. 26, 2022 (Year: 2016).

(Continued)

*Primary Examiner* — Benjamin A Schiffman
(74) *Attorney, Agent, or Firm* — Bookoff McAndrews, PLLC

(57) ABSTRACT

An additive manufacturing apparatus includes a first vertically-extending support leg, a second vertically-extending support leg, and a gantry supported on the first and second support legs. The additive manufacturing apparatus also includes a work table movably supported beneath the gantry, a print head supported on the gantry, and a trim head supported on the gantry with the print head.

20 Claims, 7 Drawing Sheets

Related U.S. Application Data

Aug. 16, 2021, now Pat. No. 11,298,873, which is a continuation of application No. 17/021,730, filed on Sep. 15, 2020, now Pat. No. 11,117,313, which is a continuation of application No. 16/692,825, filed on Nov. 22, 2019, now Pat. No. 10,786,944.

(51) Int. Cl.
*B33Y 30/00* (2015.01)
*B33Y 40/20* (2020.01)

(56) References Cited

U.S. PATENT DOCUMENTS

| | | | |
|---|---|---|---|
| 7,731,816 B2 | 6/2010 | Oldani et al. | |
| 7,810,539 B2 | 10/2010 | Mischler et al. | |
| 7,841,375 B2 | 11/2010 | Rindels | |
| 8,151,854 B2 | 4/2012 | Oldani | |
| 8,534,338 B2 | 9/2013 | Oldani et al. | |
| 8,954,180 B2 | 2/2015 | Oldani | |
| 9,440,321 B2 | 9/2016 | Susnjara | |
| 9,527,178 B2 | 12/2016 | Susnjara | |
| 9,707,721 B2 | 7/2017 | Susnjara | |
| 9,713,902 B2 | 7/2017 | Susnjara et al. | |
| 9,833,986 B1 | 12/2017 | Susnjara | |
| 10,065,361 B2 | 9/2018 | Susnjara et al. | |
| 10,071,525 B2 | 9/2018 | Susnjara et al. | |
| 10,118,340 B2 | 11/2018 | Lee | |
| 10,336,050 B2 | 7/2019 | Susnjara | |
| 10,377,124 B2 | 8/2019 | Susnjara et al. | |
| 10,449,710 B2 | 10/2019 | Susnjara et al. | |
| 10,500,785 B2 | 12/2019 | Susnjara et al. | |
| 10,549,477 B2 | 2/2020 | Susnjara et al. | |
| 10,569,521 B2 | 2/2020 | Susnjara et al. | |
| 10,569,523 B2 | 2/2020 | Susnjara et al. | |
| 10,611,073 B2 | 4/2020 | Susnjara | |
| 10,786,944 B1 * | 9/2020 | Susnjara | B29C 64/245 |
| 11,104,402 B1 | 8/2021 | Susnjara | |
| 11,117,313 B2 * | 9/2021 | Susnjara | B29C 64/30 |
| 11,298,873 B2 * | 4/2022 | Susnjara | B29C 64/188 |
| 11,618,209 B1 | 4/2023 | Susnjara et al. | |
| 11,628,614 B2 | 4/2023 | Susnjara et al. | |
| 11,969,936 B2 * | 4/2024 | Susnjara | B29C 64/118 |
| 2007/0044899 A1 | 3/2007 | Tingley | |
| 2008/0006017 A1 | 1/2008 | Rindels | |
| 2010/0200168 A1 | 8/2010 | Oldani et al. | |
| 2016/0207260 A1 | 7/2016 | Lee et al. | |
| 2016/0243762 A1 | 8/2016 | Fleming et al. | |
| 2018/0050502 A1 | 2/2018 | Oldani | |
| 2018/0056608 A1 | 3/2018 | Dunn et al. | |
| 2018/0222124 A1 | 8/2018 | Susnjara et al. | |
| 2021/0154915 A1 * | 5/2021 | Susnjara | B29C 64/118 |
| 2021/0379818 A1 * | 12/2021 | Susnjara | B33Y 30/00 |
| 2022/0184881 A1 * | 6/2022 | Susnjara | B29C 64/118 |
| 2023/0219285 A1 * | 7/2023 | Susnjara | B33Y 10/00 |
| | | | 264/138 |

OTHER PUBLICATIONS

"Prusa 13 Build manual" Jan. 12, 2013 (Year: 2013).
"Prusa i3 Build Manual." RepRap,. Mar. 17, 2016, 12:32 UTC. Apr. 26, 2022, 19:58 . (Year: 2016).
"Prusa i3." RepRap, . Feb. 24, 2019, 09:24 UTC. Apr. 26, 2022, 19:57 . (Year: 2019).
International Search Report and Written Opinion issued in International Application No. PCT/US2020/061550, mailed on Mar. 10, 2021 (16 pages).
Josef Prusa, "3D Printing Handbook—Original Prusa i3 Plus / Original Prusa i3 Plus (kit) Version: 1.75 mm" Sep. 9, 2015 (Year: 2015).
Josef Prusa, "Original Prusa i3 is now 1. 75 mm!" Aug. 26, 2015 (Year: 2015).
Sloan, "Big additive machines tackle large molds," Composites World, Jun. 11, 2019. (8 pages).

* cited by examiner

NEAR NET SHAPE ADDITIVE MANUFACTURING APPARATUS

CROSS-REFERENCE TO RELATED APPLICATIONS

This patent application is a continuation of and claims the benefit of priority to U.S. patent application Ser. No. 18/188,034, filed on Mar. 22, 2023, which is a continuation of U.S. patent application Ser. No. 17/653,531, filed on Mar. 4, 2022, now U.S. Pat. No. 11,628,614, which is a continuation of U.S. application Ser. No. 17/402,820, filed on Aug. 16, 2021, now U.S. Pat. No. 11,298,873, issued Apr. 12, 2022, which is a continuation of U.S. patent application Ser. No. 17/021,730, filed on Sep. 15, 2020, now U.S. Pat. No. 11,117,313, issued Sep. 14, 2021, which is a continuation of U.S. patent application Ser. No. 16/692,825, filed on Nov. 22, 2019, now U.S. Pat. No. 10,786,944, issued Sep. 29, 2020, the entireties of each of which are incorporated by reference herein.

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., 3D printing manufacturing techniques or processes.

BACKGROUND

Additive manufacturing techniques and processes generally involve the buildup of one or more materials to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including e.g., freeform fabrication, 3D printing, rapid prototyping/tooling, etc. Additive manufacturing techniques may be used to fabricate simple or complex components from a wide variety of materials. For example, a freestanding object can be fabricated from a computer-aided design (CAD) model.

A particular type of additive manufacturing is commonly known as 3D printing. One such process, commonly referred to as Fused Deposition Modeling (FDM) or Fused Layer Modeling (FLM) comprises a process of melting a thin layer of thermoplastic material, and applying this material in layers to produce a final part. This is commonly accomplished by passing a continuous thin filament of thermoplastic material through a heated nozzle, which melts the material and applies it to the structure being printed. The heated material may be applied to the existing structure in thin layers, melting and fusing with the existing material to produce a solid finished product.

The filament used in the aforementioned process may be produced by, for example, using a plastic extruder, which may include a steel extruder screw configured to rotate inside of a heated steel barrel. Thermoplastic material, in the form of small pellets, may be introduced into one end of the rotating screw. Friction from the rotating screw, combined with heat from the barrel, may soften the plastic, which may then be forced under pressure through a small round opening in a die that is attached to an end of the extruder barrel. This may extrude a string of material which is cooled and coiled up for use in the 3D printer.

Melting a thin filament of material in order to 3D print an item may be a slow process, which may be suitable for producing relatively small items or a limited number of items. Therefore, the melted filament approach to 3D printing may be too slow to manufacture large items. However, the fundamental process of 3D printing using molten thermoplastic materials may offer advantages for the manufacture of larger parts or a larger number of items.

In some instances, the process of 3D-printing a part may involve a two-step process. For example, the process may utilize a large print bead to achieve an accurate final size and shape. This two-step process, commonly referred to as near net shape, may begin by printing a part to a size slightly larger than needed, then machining (e.g., by milling or routing), the part to the final size and shape. The additional time required to trim the part to its final size may be compensated for by the faster printing process.

Print heads for additive manufacturing machines used to print thermoplastic material in relatively large beads have generally included a vertically-mounted plastic extruder connected to a print nozzle to deposit the bead of material onto a surface and/or part being printed. The flowable material, such as, e.g., molten thermoplastic material, may be infused with a reinforcing material (e.g., strands of fiber) to enhance the material's strength. The flowable material, while generally hot and pliable, may be deposited upon a substrate (e.g., a mold), and then pressed down or otherwise flattened and/or leveled to a consistent thickness. Traditional print heads may include an oscillating plate surrounding the nozzle, the plate being configured to oscillate vertically to flatten the bead of material against the surface or part on which the bead is deposited, which may include a previously-deposited bead of material. The deposition process may be repeated so that each successive layer of flowable material is deposited upon an existing layer to build up and manufacture a desired structure for a component or part. In order to achieve proper bonding between printed layers, it may be necessary to ensure that the temperature of the layer being printed upon is within a certain range when a layer is deposited thereon. For example, the previously-deposited layer may need to have cooled to an appropriate degree and thereby solidified sufficiently to support the new layer. However, this previously-deposited layer may need to retain sufficient heat to soften and fuse with the new layer, thus producing a solid part at the conclusion of the manufacturing process.

In near net shape additive manufacturing or 3D printing, the desired part may be printed in a series of layers. These layers may be slightly larger than the desired size of the finished part. After these layers cool and harden, the part may be trimmed to the desired final size and shape. This approach may provide the advantage of being able to print using relatively large print beads at relatively high speed, and machining or trimming the printed part to the final size and shape. This may be significantly faster than printing with a print bead fine enough to achieve the final size and shape using only the print process.

Near net shape additive manufacturing may involve two processes, a printing process and a trimming process. Conventionally, these two processes may be performed on separate machines in different locations. However, it may be desirable to perform these two separate process on a single machine. In order to perform these processes on a single machine, two gantries may be included on such machine, one for printing and one for trimming. While providing separate gantries may be suitable for relatively large machines, such as machines having a footprint or printing area of, for example, at least 10 feet by 20 feet, the inclusion of separate printing and trimming devices may introduce significant costs. Additionally, the inclusion of separate gantries may increase the size of the machine and may be less suitable for smaller machines, such as machines that have a foot print or printing area of about 10 feet by 10 feet.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects. An exemplary aspect of this disclosure is a machine configured to perform both printing and trimming operations, which may be produced at a reduced cost. The exemplary machine may have a size that is smaller than other dual-gantry machines and therefore may require less space.

In one aspect, an additive manufacturing apparatus may include a first vertically-extending support leg, a second vertically-extending support leg, and a gantry supported on the first and second support legs. The additive manufacturing apparatus may also include a work table movably supported beneath the gantry, a print head supported on the gantry, and a trim head supported on the gantry with the print head.

In another aspect, an additive manufacturing apparatus may include a fixed gantry, a print head support on the gantry, and a trim head support on the gantry with the print head. The additive manufacturing apparatus may include a vertical work table including a side surface configured to receive a bead of thermoplastic material extruded from the print head and a support member extending below the side surface of the vertical work table to support a part.

In another aspect, an additive manufacturing method may include depositing a first layer of thermoplastic material on a surface with a print head supported on a gantry, and moving the surface with the deposited thermoplastic material away from the print head. The additive manufacturing method may also include depositing one or more additional layers of thermoplastic material on the first layer of thermoplastic material, and supporting at least a portion of the first layer or one or more additional layers of thermoplastic material on a support member.

In yet another aspect, a machine may include a gantry (extending along a y-axis) mounted above a horizontal-moving print surface or work table. Once installed or assembled, the gantry may be fixed in position (e.g., the gantry does not include a motor, such as a servomotor, to move the gantry with respect to the work table). For example, while the gantry may be fixed, the work table may be movable in forward and backward directions (along an x-axis) with respect to the gantry. Two separate vertically-movable (along a z-axis) heads may be mounted on the gantry. A first one of these vertically-movable heads may be a print head for depositing material to manufacture or print a part, while the other vertically-movable head may be a trim head for removing material from the part manufactured by the print head. The gantry may be sized such that the gantry may include portions that extend to opposite sides of the work table, and beyond respective sides of the work table. Thus, the gantry may provide coverage of the entirety of the work table.

In an exemplary arrangement, the print head and the trim head may be connected to each other for moving back and forth along the gantry as a unit. Alternatively, the trim head may be moveable independent of the print head such that, during printing, the trim head may be parked or stowed in a position spaced away from a part printed on the table. In such a configuration, once the part has cooled and solidified to an approximately solid state, the print head may be moved upward and parked or stowed. The parking location of the print and trim heads may be off the table (e.g., to a side of the table). Thus, during printing of a part, the trim head may be moved completely off (to a side of) the table and parked while the part is printed, and during trimming, the print head may instead be parked. In configurations where the print and trim heads are connected and move as a unit, a parking location may instead be a raised position with respect to the z-axis such that the parked head is positioned above the active head. When the part cools, the trim head may be lowered and drawn towards the printed part in order to trim the part. Thus, the part may be trimmed using the trim head while the print head is parked. In such a configuration, the print head and trim head may operate independently while moving as a unit with respect to the gantry. Whether connected or provided as separate components, the print and trim heads may be supported on a single gantry, and may thereby produce a part as large as the table with a height that is limited only by the vertical stroke of the print head, due at least in part to the movable work table.

In one aspect, it may be desirable to produce a relatively smaller part having a height greater than the vertical (z-direction) stroke of the print head. In these instances, the machine may be reconfigured to print vertically rather than horizontally. For example, the machine may include at least one print nozzle which, when installed on the machine may allow material to flow (and be deposited) horizontally, rather than vertically. A second, vertically-extending, table having a height approximately equal to the vertical stroke of the print head, may be mounted vertically to the back of the moving horizontal table to facilitate horizontal deposition of material (e.g., on a vertically-extending surface) for vertical printing.

The vertical table may be moveable with respect to the print head. The part may be vertically-printed on the vertical table with this table positioned adjacent to the print head. As each layer is printed, coupled horizontal and vertical tables may together move away from the print head by the distance required to print the next layer or bead.

In at least some configurations, the horizontally-extending print nozzle may not deposit material at a surface of the horizontal table when instead depositing material on the vertical work table. Thus, during the manufacturing process, the part manufactured may be suspended on the vertical work table above the horizontal table. In one aspect, a distance between the horizontal table and the suspended part may initially be equal to a distance to ensure the print head has sufficient clearance above the horizontal work table during manufacturing. As the part grows, the part may benefit from support to prevent it from breaking loose from the vertical table. To provide such support, one or more conveyors, or support members such as support rails, may extend through one or more openings at the bottom of the vertical table. These conveyors may extend from the horizontal work table to a position at the bottom surface of the part. One or more rollers may be provided below this conveyor and may ride on the horizontal table for supporting support the weight of the part as it is manufactured. The back of this conveyor may be mounted in a fixed position behind the machine such that a front of the conveyor is located slightly behind a position of the nozzle where printing is performed by depositing each layer of material.

For parts which do not have a flat bottom, other forms of removable support may be used to brace and support the part. As the part may be stationary with respect to the horizontal work table (e.g., the horizontal work table and printed part may move together as a unit), the horizontal work table may be provided with one or more supports such as blocks (which may include any suitable material, such as metal, wood, etc.), mechanical lifts, hydraulic jacks, and the like.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating multiple components via additive manufacturing or 3D printing techniques. Specifically, the methods and apparatus described herein comprise a machine design which may have a lower cost while being able to perform both print and trim operations for near net shape additive manufacturing. Moreover, the methods and apparatus may provide a machine which may require less space than dual gantry designs.

Figure 1:
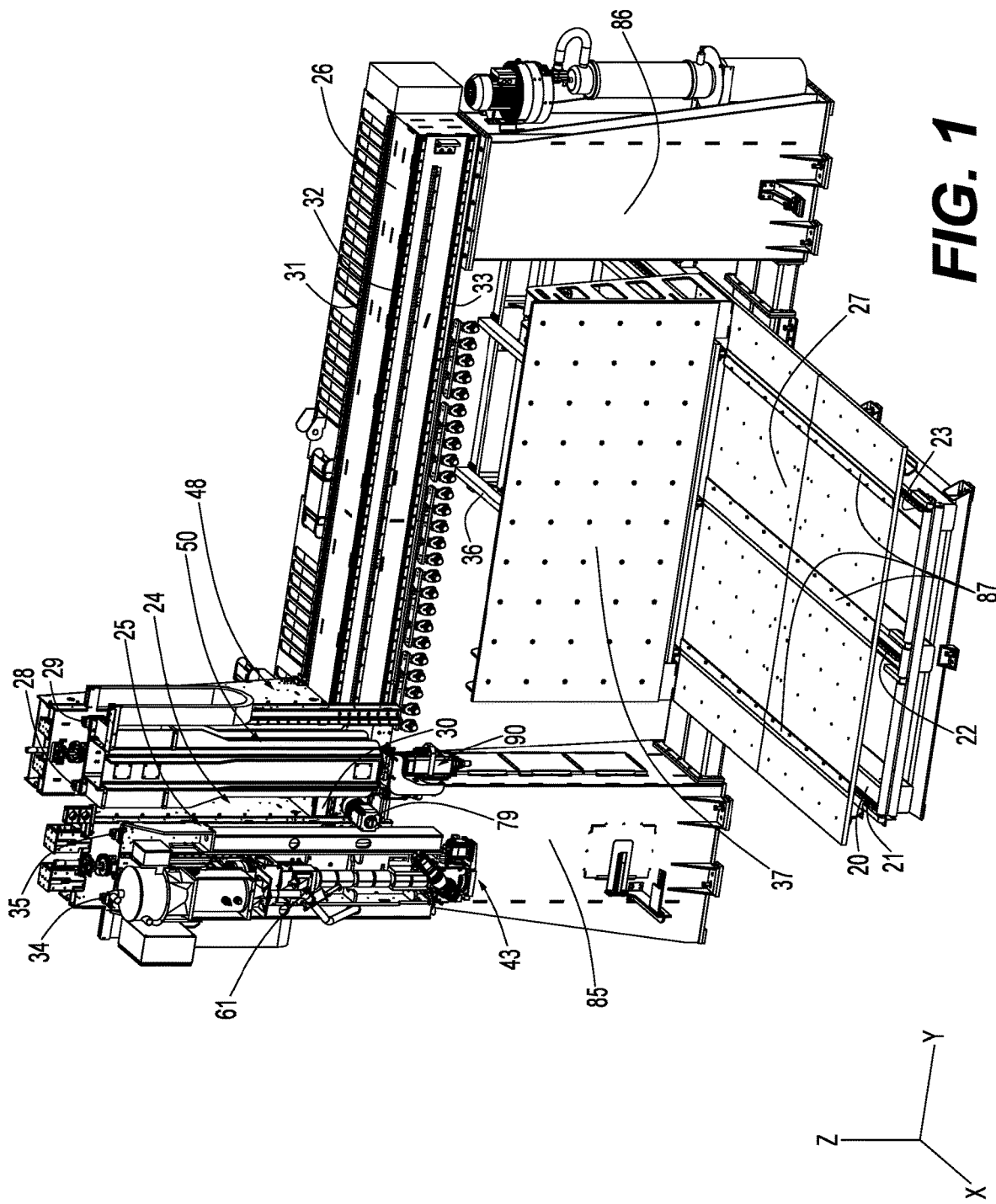
FIG. 1 is a perspective view of an exemplary CNC machine with a moving work table operable to form articles via additive manufacturing, according to an aspect of the present disclosure.

Referring to FIG. 1, an additive manufacturing apparatus or CNC machine 1 may include a horizontal work table 27 including a horizontal surface that is disposed in an x-y (horizontal) plane. Horizontal work table 27, including the horizontal surface, may be movable along a set of guide rails 21, 22, and 23. Each of the guide rails 21, 22, and 23 may each extend along an x-axis on a bed 20. A gantry 26 may extend horizontally over work table 27. In the exemplary configuration shown in FIG. 1, gantry 26 may extend along a y-axis that is orthogonal or approximately orthogonal to the x-axis. Gantry 26 may extend horizontally over at least an entire width of work table 27. Gantry 26 may be supported on a pair of vertically-extending support legs 85 and 86 which are mounted to the bed 20. The gantry may be fixed in position (e.g., the gantry does not include a mechanism or motor, such as a servomotor, to move the gantry in either a vertical direction, a horizontal direction, or both). If desired, a fume extraction system may be provided within one or both of support legs 85 and 86 to remove smoke and/or fumes created during operation of CNC machine 1.

A pair of carriages, such as print carriage 24 and trim carriage 48, may be supported on gantry 26. In one aspect, carriages 24 and 48 may together be supported on a single support member 30 mounted to and displaceable along one or more guide rails 31, 32, and 33. Guide rails 31, 32, and 33 may be provided on the gantry 26 so as to extend along the y-axis. Carriages 24 and 48 may be displaceable as a unit by a servomotor 79, along a y-axis on one or more guide rails 31, 32, and 33. As shown in FIG. 1, rails 31, 32, and 33 may be mounted on the gantry 26 and operatively connected to support member 30. Guide rails 31, 32, and 33 may, in at least some configurations, extend longer than a width of work tables 27 and 37. In an alternative configuration, carriages 24 and 48 may be provided with separate support members (e.g., a plurality of support members 30) and separate servomotors, so as to be displaceable along one or more guide rails 31, 32, and 33 (and the y-axis) independent of each other.

A trim carrier 50 for trim head 90 may be mounted on a set of spaced apart, vertically-extending guide rails 28, 29. Guide rails 28, 29 may be supported on trim carriage 48 for displacement of trim carrier 50 and trim head 90 relative to the trim carriage 48 along a vertical direction or z-axis. In a similar manner, a print carrier 25 for print head (or applicator head) 43 may be mounted on a set of spaced apart, vertically-extending guide rails 34, 35 supported on print carriage 24 for displacement of print carrier 25 relative to print carriage 24 along a z-axis. The print and trim carriers 25 and 50 may be slidably displaceable with respect to the z-axis by two or more servomotors respectively mounted on print and trim carriages 24 and 48 and operatively connected to print carrier 25 and trim carrier 50, respectively. Trim carrier 50 may be configured to be moved to an upward parked location above a top edge of vertical work table 37 to avoid interference with print carrier 25 or with a part being manufactured. For example, trim carrier 50 may be parked while the print carrier 25 is active and moving with respect to work table 27. Similarly, print carrier 25 may be moved upward and parked with while trim carrier 50 is operating. In configurations where print carrier 25 and trim carrier 50 are separate and movable independent with respect to the y-axis, one of the carriers 25, 50 may positioned or parked to the side of the table along the y-axis while the other of the carrier 25, 50 operates over horizontal work table 27, thus allowing the operating carrier to move from side to side with respect to work table 27 without interference from the other carrier.

Vertical work table 37 may be detachably mounted to a top end or surface of the horizontal work table 27 for vertically printing parts. A conveyor or support member 36, such as a slide or support rail, may be detachably mounted to an end of bed 20. In one aspect, support member 36 may be provided as a plurality of rails 36 that extend along the x-axis and may be configured to roll and/or slide with respect to wear plates 87 supported on top of horizontal work table 27. Wear plates 87 may extend below vertical work table 37, as shown in FIG. 1. Vertical work table 37 may be configured to move backward from the perspective of FIG. 1 in a direction away from gantry 26 (along the x-axis) while support members 36 remain at an approximately constant position underneath vertical work table 37, and with respect to gantry 26, for supporting vertically printed parts. As described below, the part may slide along a surface of one or more support members 36 during manufacturing in this manner.

Figure 2:
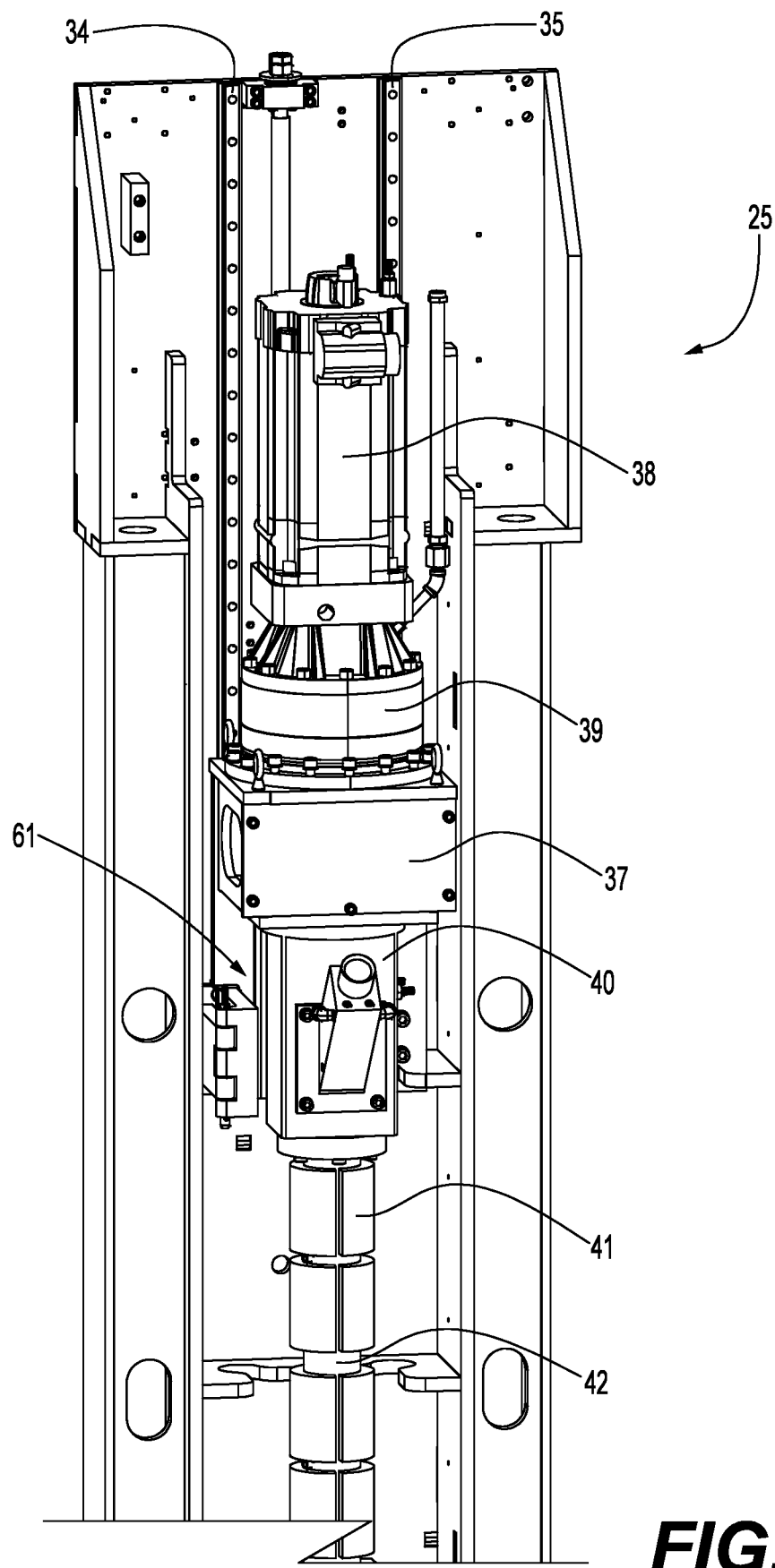
FIG. 2 is a perspective view of an exemplary carrier and extruder assembly of the CNC machine shown in FIG. 1.

Extruder 61 (FIG. 1) may be mounted in a linearly movable manner to carrier 25 by a set of rails 34 and 35 and bearings (not shown) on rails 34 and 35. With reference to FIG. 2, extruder 61 may be driven by a servomotor 38 through a gearbox 39 which is attached to transition housing 37. Extruder 61 may receive thermoplastic pellets through a feed housing 40. An extruder screw of extruder 61 may transfer this thermoplastic material through a barrel 42 where the pellets are melted by friction of the rotating screw and/or heat produced by heaters 41. Molten thermoplastic material may be provided by extruder 61 to positive displacement gear pump 62 (FIGS. 3 and 4).

Figure 3:
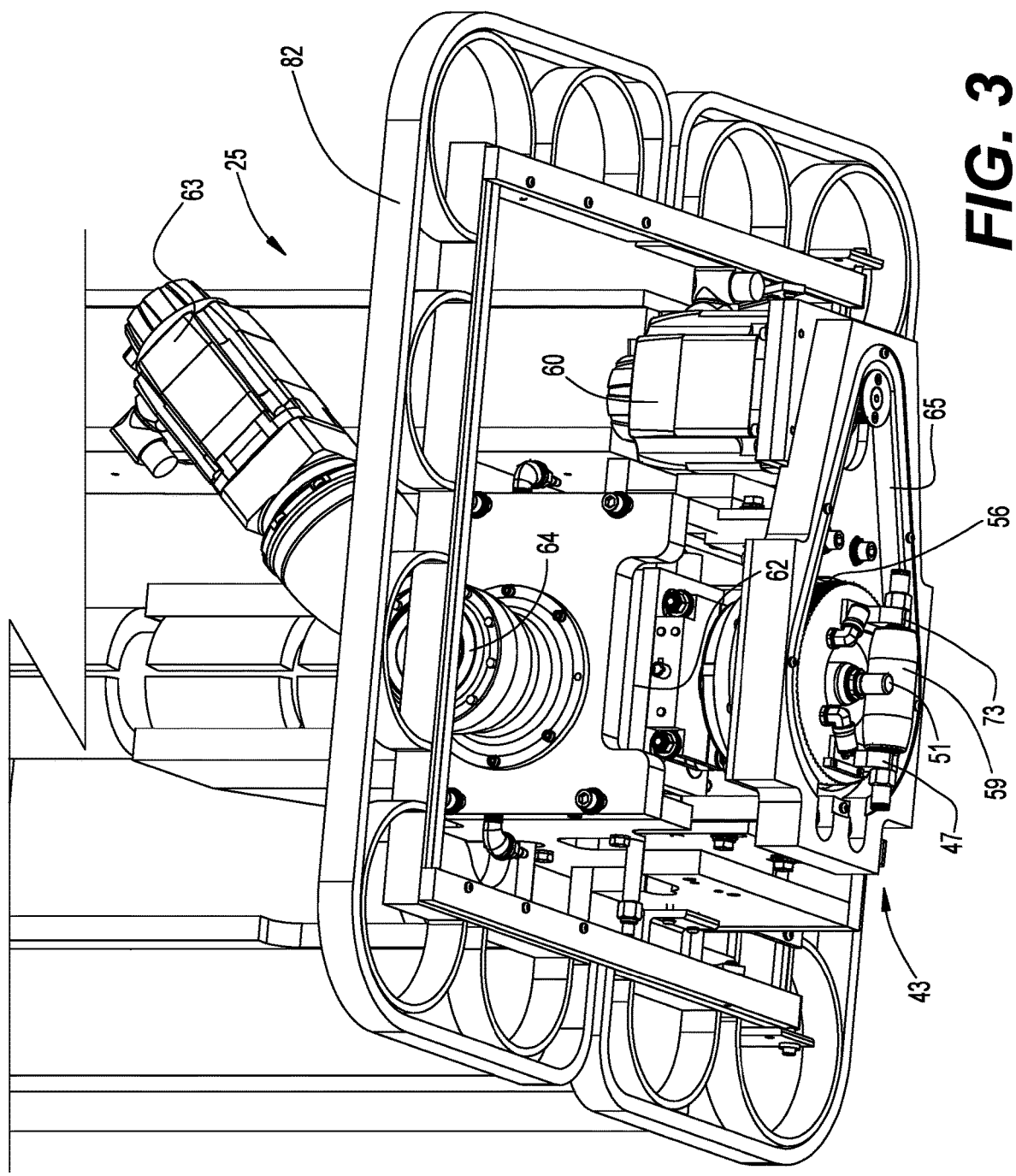
FIG. 3 is an enlarged perspective view of an exemplary carrier and applicator assembly of the exemplary CNC machine shown in FIG. 1.

As best shown in FIG. 3, positive displacement gear pump (or melt pump) 62 may be fixedly mounted to the bottom of carrier 25. Gear pump 62 may be driven by a servomotor 63 through a gearbox 64. The gear pump 62 may receive molten plastic material from extruder 61, as described above, in order to meter out precise amounts of thermoplastic material at determined flow rates to nozzle 51 to print the part. The use of both extruder 61 and melt pump 62 together may provide the ability to utilize extruder screw configurations which may cause uneven flow in configurations where only an extruder is provided. In one aspect, the melt pump may act to even out material flow and provide increased design freedom for the extrusion screw.

Print head or applicator head 43 may be attached below gear pump 62. Applicator head 43 may include a bead shaping roller 59 rotationally mounted in carrier bracket 47, may provide a means for flattening and leveling an oversized bead of fluid material (e.g., molten thermoplastic material) extruded by the nozzle 51. Carrier bracket 47 may be adapted to be rotationally displaced by a servomotor 60. For example, servomotor 60 may be operably connected to carrier bracket 47 by a pulley or sprocket 56 and belt or chain 65. Applicator head 43 and nozzle 51 may be used for printing horizontally e.g., on a horizontally-extending surface such as horizontal work table 27, as shown in FIG. 1. When horizontal printing is performed, vertical work table 37, support slide rails 36, and wear plates 87 may be removed from CNC machine 1. Applicator head 43 may include a safety bumper 82 provided around applicator head 43 to pause or stop operation of CNC machine 1 if an obstacle is encountered.

Figure 4:
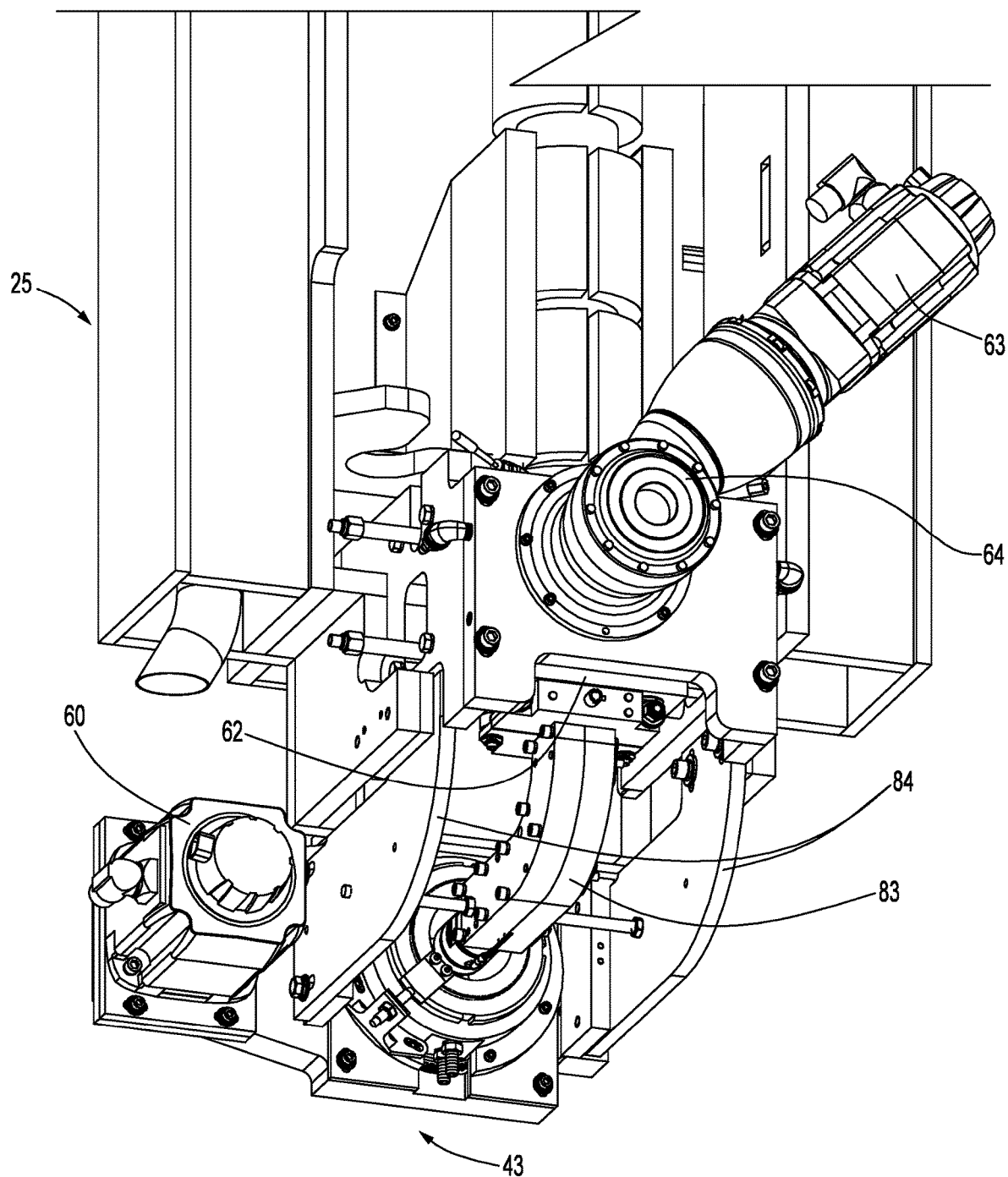
FIG. 4 is an enlarged perspective view of an exemplary carrier and applicator head for vertical printing with the CNC machine shown in FIG. 1.

With reference to FIG. 4, applicator head 43 may be fixed below the gear pump 62 at a position that is angled or rotated 90° with respect to print carrier 25, as compared to the position of applicator head 43 shown in FIG. 3. Thus, the configuration of FIG. 3 may be employed for printing on a horizontal surface (e.g., horizontal work table 27). This configuration may be referred to as a horizontal-printing configuration. The configuration illustrated in FIG. 4 may be employed for printing on a vertical surface (e.g., vertical work table 37), referred to herein as a vertical-printing configuration. In each of the horizontal-printing and vertical-printing configurations shown in FIGS. 3 and 4, respectively, applicator head 43 itself may have the same shape and components. The 90° change in the position of applicator head 43 between these configurations may be achieved by installing a 90° angled transition joint 83 between gear pump 62 and nozzle 51 (see FIG. 3), as shown in FIG. 4. Additional support for applicator head 43 may be provided by one or more 90° mount plates 84 for connecting to the application head 43. In the exemplary vertical-printing configuration illustrated in FIG. 4, a pair of 90° mount plates 84 may be provided on opposite sides with regards to 90° angled transition joint 83. When applicator head 43 and gear pump 62 are connected to each other by 90° angled transition joint 83, applicator head 43 may be configured to print vertically on vertical work table 37 by extending material through horizontally-extending nozzle 51, as shown in FIG. 1. Also, in the vertical-printing configuration, gear pump 62 may be driven by the same servomotor 63 and gearbox 64 as the horizontal-printing configuration shown in FIG. 3.

When in the horizontal-printing configuration, the CNC machine 1 may print a part as tall as a height (z-axis) limit that corresponds to a maximum printing height of CNC machine 1. When in the vertical-printing configuration, CNC machine may print a part as long as a length (x-axis) limit that corresponds to the available horizontal work table space.

Figure 5:
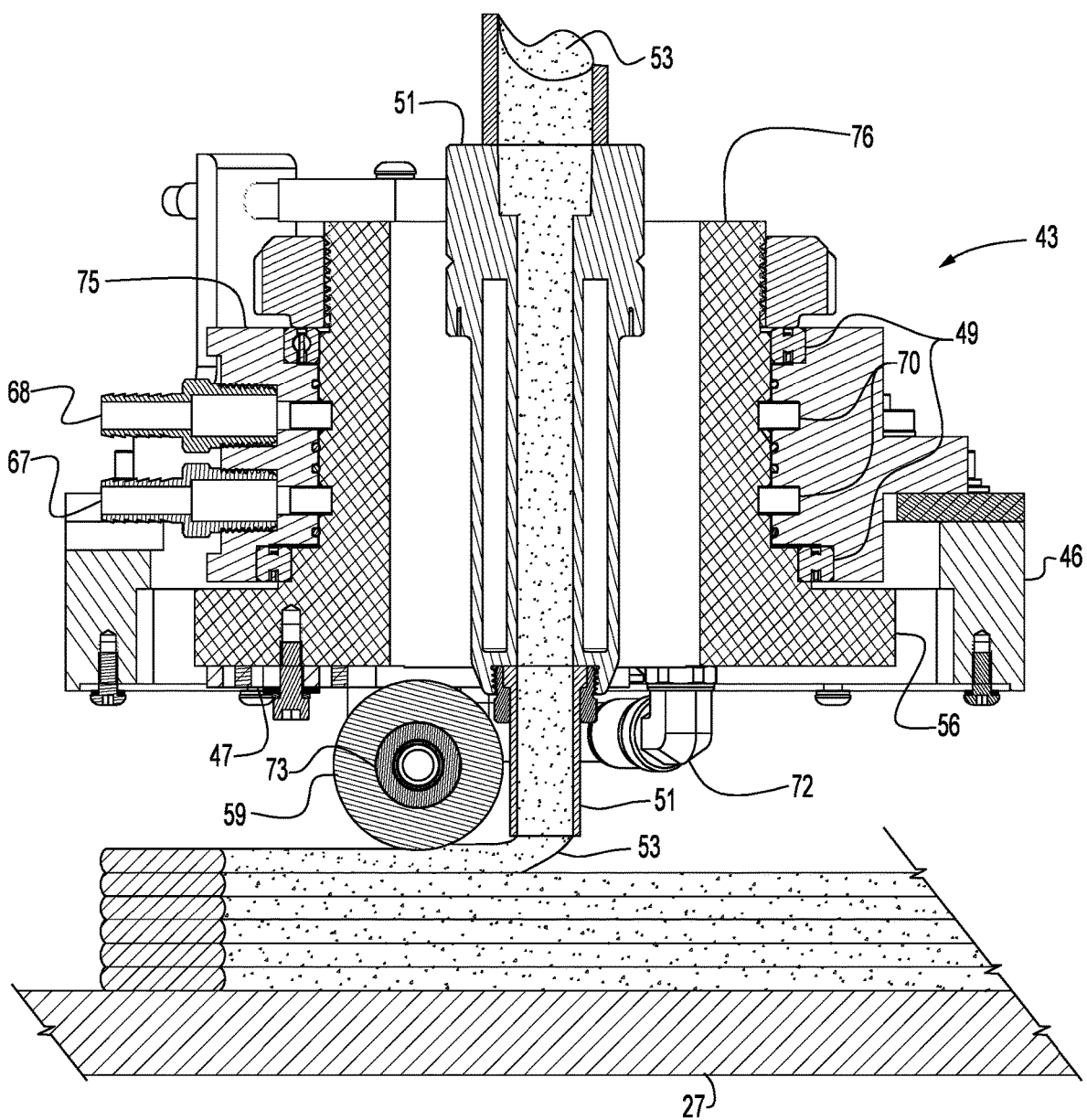
FIG. 5 is an enlarged cross-sectional view of the exemplary applicator head shown in FIGS. 3 and 4.

With reference to FIG. 5, applicator head 43 may include a housing 46 with a rotary union mounted therein. A sprocket 56 may be machined into an inner hub 76 of the rotary union. The inner hub 76 may have an opening with a diameter sized to receive the heated print nozzle 51. The inner hub 76 may rotate on a set of bearings 49 provided in an outer housing 75 of the rotary union. A compression roller assembly may be attached to the inner hub 76 of the rotary union such that compression roller 59 rotates about the print nozzle 51. The rotary union may also contain barb fittings 67 and 68 in fluid communication with coolant passages 70. In one aspect, coolant passages 70 may surround the inner hub 76 and the inside of the outer housing 75 of the rotary union. Coolant passages 70 may continue through quick disconnect fittings 72 into the axle 73 of the compression roller 59. Applicator head 43 may be usable in both the horizontal-printing configuration the vertical-printing configuration (by attaching 90° angled transition joint 83 and optionally one or more 90° mount plates 84).

As shown in FIGS. 3-5, an oversized molten bead of a flowable material (e.g., molten thermoplastic) may be provided under pressure from a source disposed on carrier 25 (e.g. gear pump 62) or another source, to applicator head 43. This material may be provided to nozzle 51 in communication with applicator head 43, which may be fixedly connected to carrier 25. In use, the flowable material 53 (e.g., thermoplastic material) may be heated sufficiently to form a large molten bead, which is then extruded through applicator nozzle 51 to form substantially uniform, smooth rows of deposited material on work tables 27, 37 in a series of layers. Such beads of molten material may be flattened, leveled, and/or fused to adjoining layers with substantially no trapped air by bead-shaping compression roller 59 with the layers forming 3D printed products.

Figure 6:
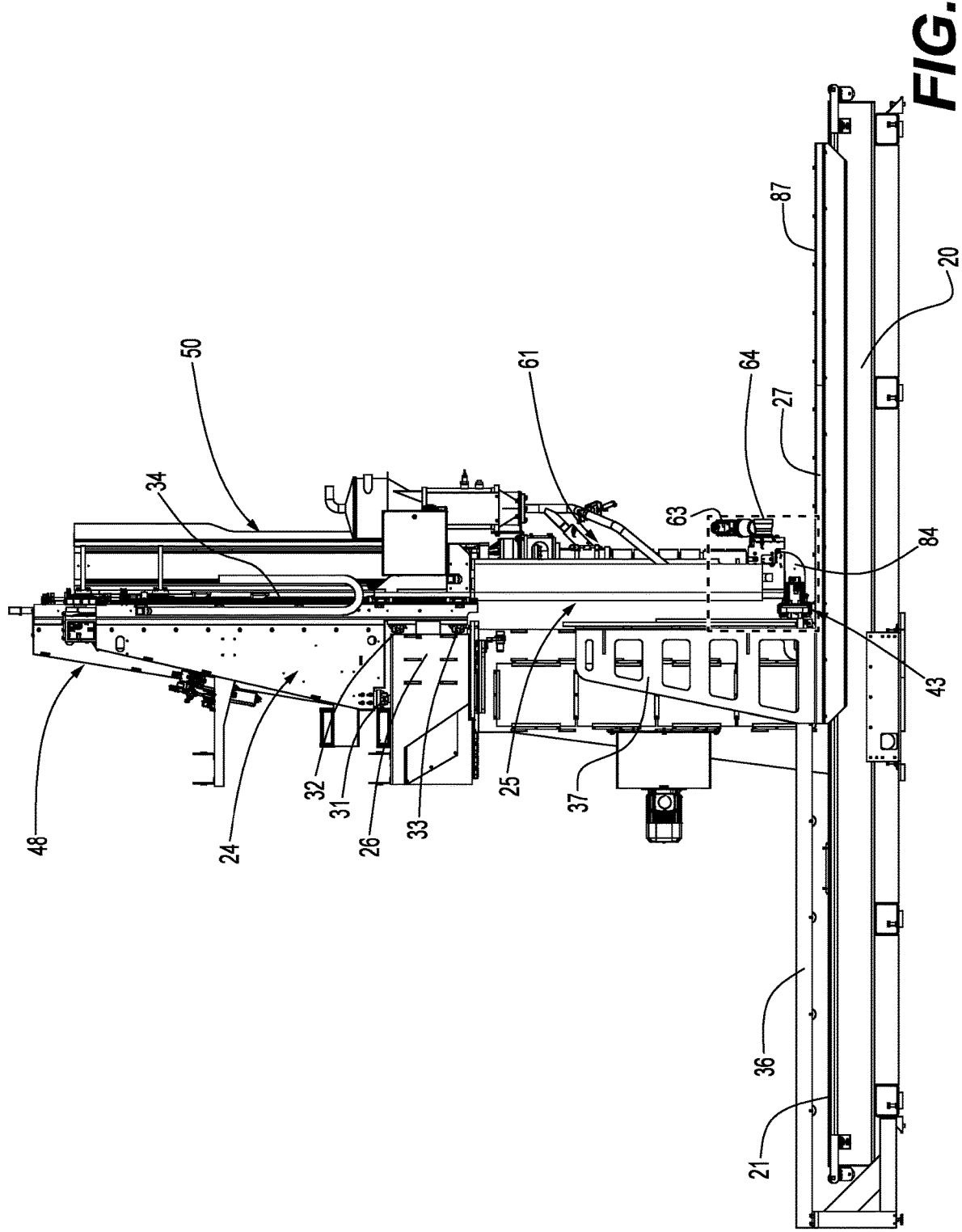
FIG. 6 is a side view of the exemplary CNC machine and work table shown in FIG. 1.

FIG. 6 is a side view of CNC machine 1 with the gantry support leg 85 omitted for clarity. The detachable vertical work table 37 may be attached and used in conjunction with the vertical-printing configuration for applicator head 43 to allow CNC machine 1 may to produce relatively long parts without increasing the height of the machine. Vertical work table 37 may be mounted directly to a top end of the movable horizontal work table 27. One or more detachable support members 36, such as rails, may be fixed underneath vertical work table 37 to support the vertically-printed part. Support member 36 may slide or roll (e.g., by rollers) with respect to wear plates 87 fixed (e.g., by bolts) to horizontal work table 27. For example, once a layer of thermoplastic material is deposited in one or more rows on vertical work table 37, the horizontal and vertical work tables 27, 37 may move as a unit away from applicator head 43. During this motion, horizontal work table 27, may slide along a roller of support member 36. As the roller rotates due to the motion of work table 27, the roller and support member 36 may remain in an approximately constant position. Thus, as the layers of the part are deposited, support members 36 may create a shelf surface that applicator head 43 can print against and that may provide support to the part.

While the vertical work table 37 moves away from applicator head 43, the detachable support members 36 may advance through an opening at the bottom of vertical work table 37 due to the motion of vertical work table 37. The part may be supported with respect to gravity by support member 36. Moreover, the part may slide across the upper surface of support member 36 while remaining secured to vertical work table 37. As described above, vertical work table 37, support members 36, and wear plates 87 may be removable, thereafter allowing CNC machine 1 to print on an entire top surface of the horizontal work table 27 with applicator head 43 in the horizontal-printing configuration.

Figure 7:
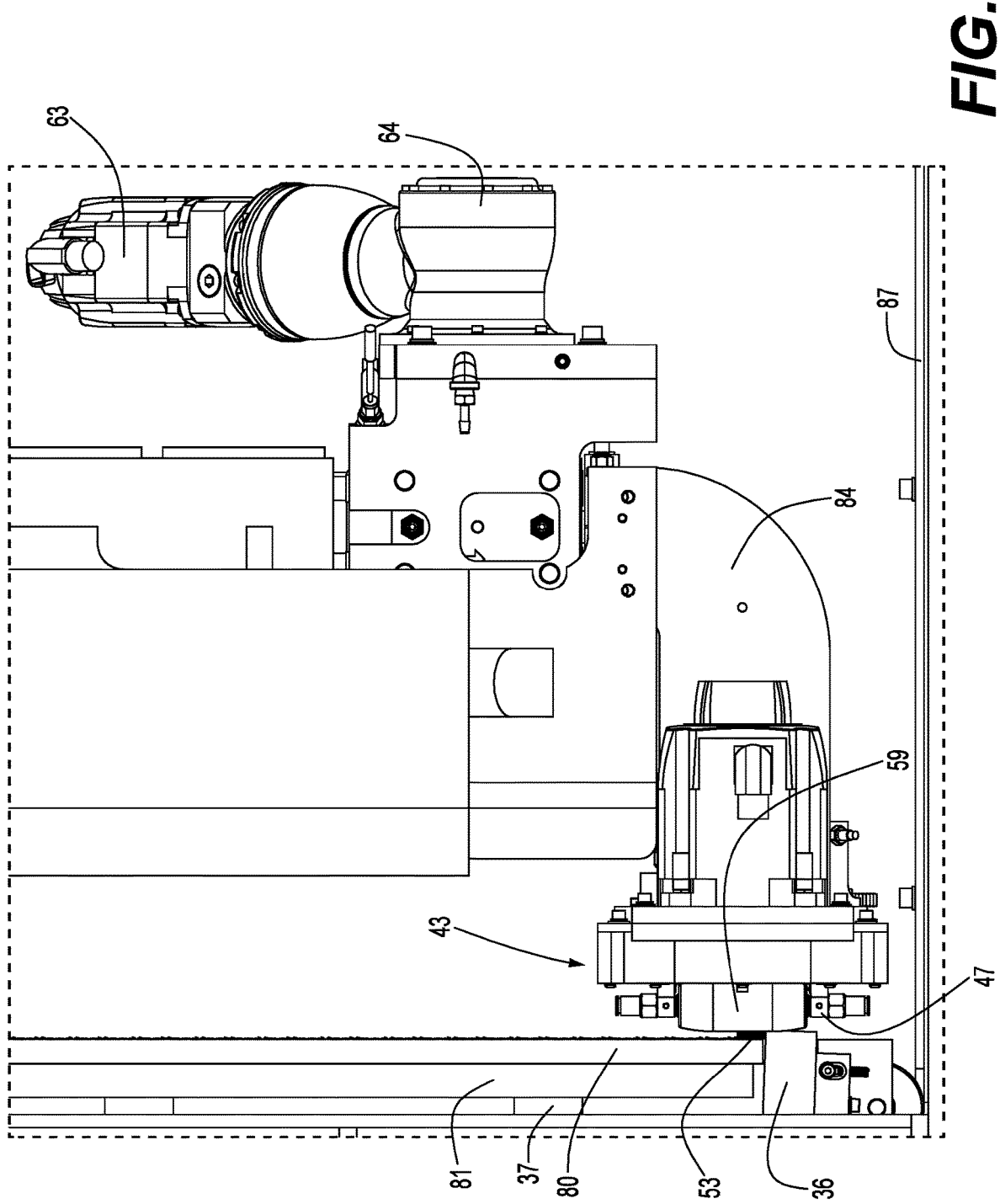
FIG. 7 is an enlarged side view of the indicated portion of FIG. 6.

FIG. 7 is an enlarged view of the section of FIG. 6 within the a dashed-line box. Thermoplastic material 53 may be horizontally extruded from applicator head 43 through nozzle 51 (which is behind compression roller 59 from the perspective of FIG. 7) onto a surface of vertical work table 37. In one configuration, this vertical surface may be provided on a pellet or bead board 80 secured to a base board 81. Compression roller 59 may be configured to compress and flatten bead 53 against pellet board 80. Pellet board 80 and base board 81 may together be removably fastened to vertical work table 37. After the first layer of thermoplastic material is deposited on a side surface of pellet board 80 and before nozzle 51 begins deposition of the next layer, vertical work table 37 may be drawn or moved in a direction away from applicator head 43, as described above. In one aspect, the distance of this movement of vertical work table 37 may be approximately equal to the thickness of one layer of a bead of thermoplastic material 53. One or more additional layers may be deposited on the first layer. After the deposition of each layer, the above-described movement may be repeated. In one aspect, this movement may be performed by a servomotor and gearbox that are controlled with the use of feedback from one or more encoders. As vertical work table 37 is drawn away from applicator head by the distance of one layer of material 53, support member 36 may remain in place, allowing the part to slide along a support surface formed at the top of each support member 36.

This process may be repeated until the part, which may have a length equal to the length of the horizontal work table 27, is complete. As vertical work table 37 moves away from applicator head 43 in a layer-by-layer manner, a length of the part may grow and the part may slide layer-by-layer, along the surface of support member 36. Thus, a bottom surface of the growing part may be slidably supported on support member or rail 36. Any of the layers may be supported on support member 36, including the first layer or one or more additional layers. In an exemplary configuration, once the part reaches a sufficient length due to the deposition of a plurality of layers, the part may extend downward by a distance sufficient to reach support member 36. Thus, support member 36 may prevent undesired separation of the part from vertical work table 37 and/or pellet board 80.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited by the appended claims.

What is claimed is:

1. An additive manufacturing apparatus, comprising:
a horizontally-extending work surface;
a vertically-extending work surface; and
an applicator head configured to transition between a horizontal-printing configuration employing the horizontally-extending work surface and a vertical-printing configuration employing the vertically-extending work surface.

2. The additive manufacturing apparatus of claim 1, wherein the applicator head includes a nozzle configured to allow a material to vertically extrude onto the horizontally-extending work surface when the applicator head is in the horizontal-printing configuration.

3. The additive manufacturing apparatus of claim 2, wherein the nozzle is further configured to allow the material to horizontally extrude onto the vertically-extending work surface when the applicator head is in the vertical-printing configuration.

4. The additive manufacturing apparatus of claim 2, wherein the applicator head further includes a roller configured to compress the material extruded by the nozzle.

5. The additive manufacturing apparatus of claim 4, wherein the roller is further configured to rotate about the nozzle.

6. The additive manufacturing apparatus of claim 1, wherein the applicator head is configured to transition between the horizontal-printing configuration and the vertical-printing configuration via an angled transition joint.

7. The additive manufacturing apparatus of claim 6, wherein the angled transition joint is a 90° angled transition joint when the applicator head is in the vertical-printing configuration.

8. The additive manufacturing apparatus of claim 7, wherein the vertically-extending work surface is configured to be removed from the additive manufacturing apparatus when the applicator is in the horizontal-printing configuration.

9. The additive manufacturing apparatus of claim 1, wherein the vertically-extending work surface is removably coupled to the additive manufacturing apparatus.

10. The additive manufacturing apparatus of claim 1, wherein the applicator head is further configured to receive one or more mount plates when the applicator head is in the vertical-printing configuration.

11. An additive manufacturing apparatus, comprising:
a horizontally-extending work surface;
a vertically-extending work surface;
an applicator head including a nozzle, the applicator head being configured to transition between a horizontal-printing configuration employing the horizontally-extending work surface and a vertical-printing configuration employing the vertically-extending work surface; and
a gear pump configured to be driven by a motor to meter out a material to the nozzle.

12. The additive manufacturing apparatus of claim 11, wherein the gear pump is configured to be driven by the motor when the applicator head is in the horizontal-printing configuration and when the applicator head is in the vertical-printing configuration.

13. The additive manufacturing apparatus of claim 11, wherein the applicator head is disposed below the gear pump.

14. The additive manufacturing apparatus of claim 11, wherein the applicator head is configured to transition between the horizontal-printing configuration and the vertical-printing configuration via an angled transition joint.

15. The additive manufacturing apparatus of claim 14, wherein the angled transition joint is disposed between the applicator head and the gear pump.

16. An additive manufacturing apparatus, comprising:
a movable, horizontally-extending work surface;
a vertically-extending work surface; and
an applicator head configured to transition between a horizontal-printing configuration employing the movable, horizontally-extending work surface and a vertical-printing configuration employing the vertically-extending work surface.

17. The additive manufacturing apparatus of claim 16, wherein the movable, horizontally-extending work surface and the vertically-extending work surface are configured to move together as a unit when the applicator head is in the vertical-printing configuration.

18. The additive manufacturing apparatus of claim 17, wherein the vertically-extending work surface is mounted to the movable, horizontally-extending work surface.

19. The additive manufacturing apparatus of claim 17, further comprising at least one support member disposed below the vertically-extending work surface, wherein the at least one support member includes at least one roller, and wherein the horizontally-extending work surface is configured to slide along the at least one roller of the at least one support member.

20. The additive manufacturing apparatus of claim 19, wherein the vertically-extending work surface and the at least one support member are removably coupled to the additive manufacturing apparatus and wherein the vertically-extending work surface and the at least one support member are removed from the additive manufacturing apparatus when the applicator head is in the horizontal-printing configuration.

* * * * *